United States Patent [19]

Okajima et al.

[11] 4,000,941
[45] Jan. 4, 1977

[54] AUTOMATIC EXPOSURE ADJUSTING DEVICE

[75] Inventors: Hidekazu Okajima, Kawasaki; Tomoshi Takigawa, Machida; Noritsugu Hirata, Yokohama; Masamichi Toyama, Machida; Toshikazu Ichiyanagi, Tokyo, all of Japan

[73] Assignee: Canon Kabushiki Kaisha, Tokyo, Japan

[22] Filed: Feb. 24, 1975

[21] Appl. No.: 552,368

[30] Foreign Application Priority Data

Mar. 1, 1974 Japan .............................. 49-23947

[52] U.S. Cl. .................................. 352/141; 354/26; 354/59
[51] Int. Cl.$^2$ .......................................... G03B 7/08
[58] Field of Search ............... 352/141; 354/26, 29, 354/30, 59

[56] References Cited

UNITED STATES PATENTS

| 1,213,485 | 1/1917 | Herz | 352/141 |
|---|---|---|---|
| 2,186,613 | 1/1940 | Mihalyi | 352/141 |
| 2,518,717 | 8/1950 | Rath | 352/141 |
| 3,086,434 | 4/1963 | Edelstein | 352/141 |
| 3,143,046 | 8/1964 | Pennock | 352/141 |
| 3,705,764 | 12/1972 | Reinsch | 352/141 |
| 3,807,843 | 4/1974 | Tarigawa | 352/141 |
| 3,815,984 | 6/1974 | Mayr | 352/141 |

Primary Examiner—Monroe H. Hayes
Attorney, Agent, or Firm—Toren, McGeady and Stanger

[57] ABSTRACT

The present invention relates to an automatic exposure adjusting device for a camera or the like, comprising a single photometric mechanism capable of measuring the light corresponding to the light amount entering into a photosensitive material such as film, the first light amount control mechanism driven in accordance with the output of the photometric mechanism for controlling the light amount over the range of the ordinary brightness and the second light amount control mechanism capable of operating in accordance with the output of the photometric mechanism beyond the operation range of the first light amount control mechanism, whereby for the brightness of the object beyond the range of the ordinary brightness the second light amount control mechanism is automatically operated in accordance with the output of the photometric mechanism so as to give a proper exposure.

28 Claims, 10 Drawing Figures

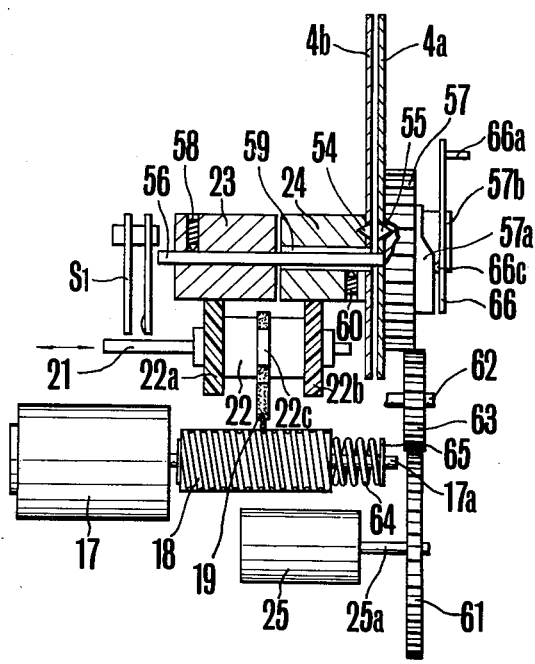

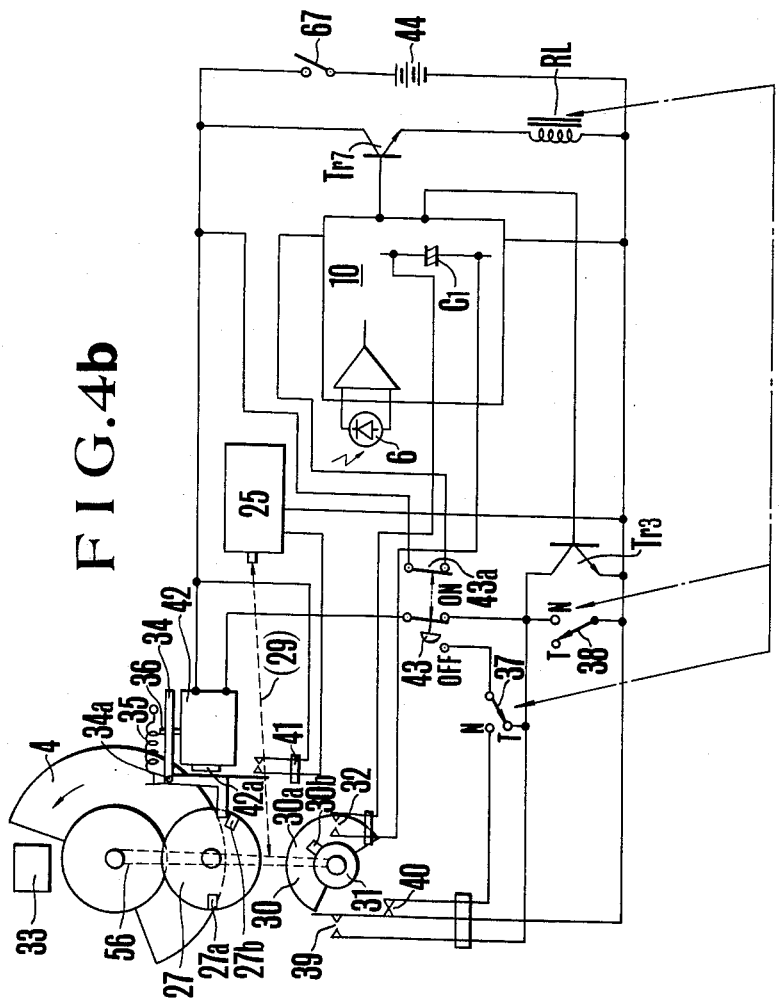

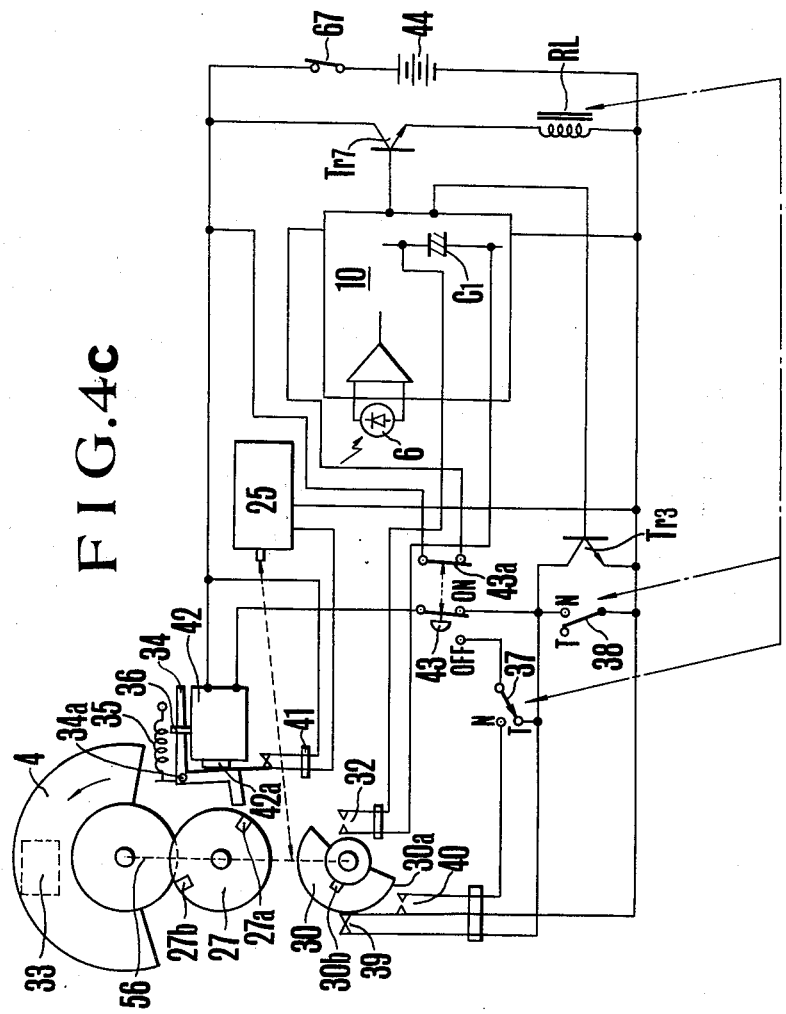

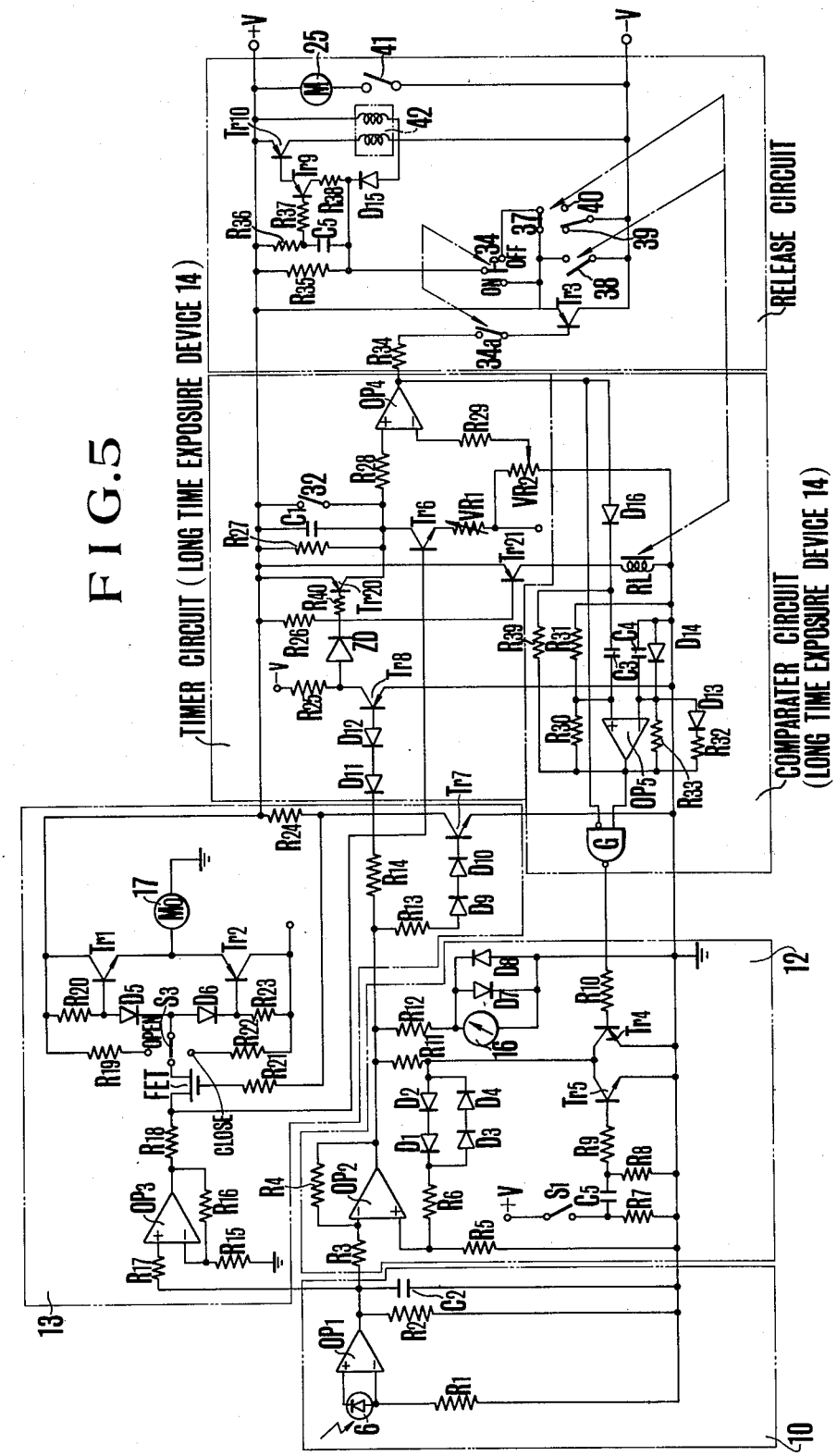
F I G. 5

AUTOMATIC EXPOSURE ADJUSTING DEVICE

BACKGROUND OF THE INVENTION

1. Field of the Invention:

The present invention relates to an automatic exposure controlling device for camera or the like.

2. Description of the Prior Art:

For example, in case of the conventional automatic exposure adjusting device for a motion picture camera, the light corresponding to the light amount entering into a photosensitive material such as film is measured, so as to control the diaphragm blades in order to control the light amount entering into the film in accordance with the measured light amount.

In case of this kind of the conventional automatic exposure adjusting device, various exposure adjusting means such as diaphragm blade and shutter opening angle control means, number of pictures per second control means, long time exposure photographing means and so on is so designed as to operate automatically in accordance with the output of the photometric mechanism, whereby it is difficult to adjust and control various light amount control mechanism by means of a photometric light sensing element built in the camera body in order to enlarg the photographing range so that the light beam entering into each light sensing element, by treating the variation of the light beam of the object detected by various kinds of the light amount control means by means of a secondary optical adjusting means. However, in case of photographing with this kind of camera by means of the above mentioned various light amount control means, it is necessary for the photographer to switch the photographing means manually over for example, into the ordinary diaphragm control photographing depending upon the condition of the illumination at the object and further at times a troublesome operation is also necessary to switch the long time exposure photographing back into the instantaneous photographing by means of the diaphragm control.

SUMMARY OF THE INVENTION

The first purpose of the present invention is to offer an automatic exposure adjusting device capable of controlling the light amount entering into the film over a range down from a very low brightness up to a very high brightness, eliminating the above mentioned shortcomings.

The second purpose of the present invention is to offer an automatic exposure adjusting device capable of measuring by means of a single photometric means the brightness of various object covering a wide range down from a very low brightness up to a very high brightness and of making other light amount control means such as the light amount control means for a low brightness or the light amount control means for a high brightness than the ordinary light amount control means such as the diaphragm automatically operate in accordance with the output of the single photometric means in order to give a proper exposure.

The third purpose of the present invention is to offer an automatic exposure adjusting device which comprises a single photometric means capable of measuring the light corresponding to the light amount entering into a photo-sensitive material such as film, the first light amount control means driven in accordance with the output of the phtometric means for controlling the light amount over the range of the ordinary brightness and the second light amount control means capable of operating in accordance with the output of the photometric means beyond the operation range of the first light amount control means, whereby for the brightness of the object beyond the range of the ordinary brightness the second light amount control means is automatically operated in accordance with the output of the photometric means so as to give a proper exposure.

The fourth purpose of the present invention is to offer for a camera capable of the instantaneous photographing and the long exposure time photographing an automatic exposure adjusting device capable of controlling the exposure amount adjusting device and the exposure time adjusting device by means of a photmetric means presenting a photoelectric converting element placed behind the shutter blades.

The fifth purpose of the present invention is to offer for a camera capable of the instantaneous photographing and the long time exposure photographing an automatic exposure adjusting device capable of operating and controlling the exposure timer mechanism by means of a photmetric means in case the long time exposure photographing mechanism is operated for holding the shutter blades stopped while the picture window is kept opened.

The sixth purpose of the present invention is to offer for a camera capable of the instantaneous photographing and the long time exposure photographing an automatic exposure adjusting device being equiped with the engaging and disengaging switch for operating and controlling the exposure timer mechanism by means of a photometric means and for breaking the engagement of the exposure timer mechanism with the photometric means in case the long time exposure photographing mechanism is operated for holding the shutter blades stopped while the picture window is kept opened.

The seventh purpose of the present invention is to offer an automatic exposure adjusting device capable of always giving a proper exposure to the film for a wide range down from a very low brightness up to a very high brightness of the object, by placing a combination of a photo-voltaic cell such as SPC and an operation amplifier at a position behind the shutter blades at which the combined elements can receive primarily the light beam under the same condition as on the film plane so as to control by feeding back the diaphragm blades, shutter opening angle and other light amount control means or the exposure timer for a long exposure time photographing and further to carry out the selective switching of the light amount decreasing means or of the exposure time determining means by means of the output of the photometric circuit, whereby for example, the instantaneous photographing by controlling diaphragm can automatically switched over into the long exposure time photographing by holding the shutter fully opened to the film plane, the shutter opening angle and further the film feeding speed can also be automatically varied without troublesome manual operation by the photographer.

Further other purposes of the present invention will be disclosed from the explanation made according to the accompanying drawings.

BRIEF DESCRIPTION OF THE DRAWINGS

FIG. 3 shows a front view of the shutter opening angle adjusting means shown in FIGS. 1 and 2 in partial section.

FIG. 4 shows an electrical wiring diagram for showing the electrical connection of the long exposure time photographing means with the photometric means in the automatic exposure adjusting device shown in FIGS. 1 to 3, whereby FIG. 4(b) shows the state for the long exposure time photographing, FIG. 4(c) also shows the state for the long expousre time photographing whereby the shutter blade 4 is on the way of rotation

FIG. 5 shows the block diagram shown in FIG. 1 to FIG. 4 more in detail, namely the electric circuit for automatically selecting and operating the diaphragm control means, the shutter opening angle control means and the long exposure time photographing means.

Table 1 shows the relation between the brightness of the object and the time at which the exposure control device shown in FIGS. 1 to 6 in accordance with the present inventive operates.

DESCRIPTION OF THE PREFERRED EMBODIMENT

Below several embodiments of the present invention will be explained in detail in accordance with the accompanying drawings.

Figure 1:
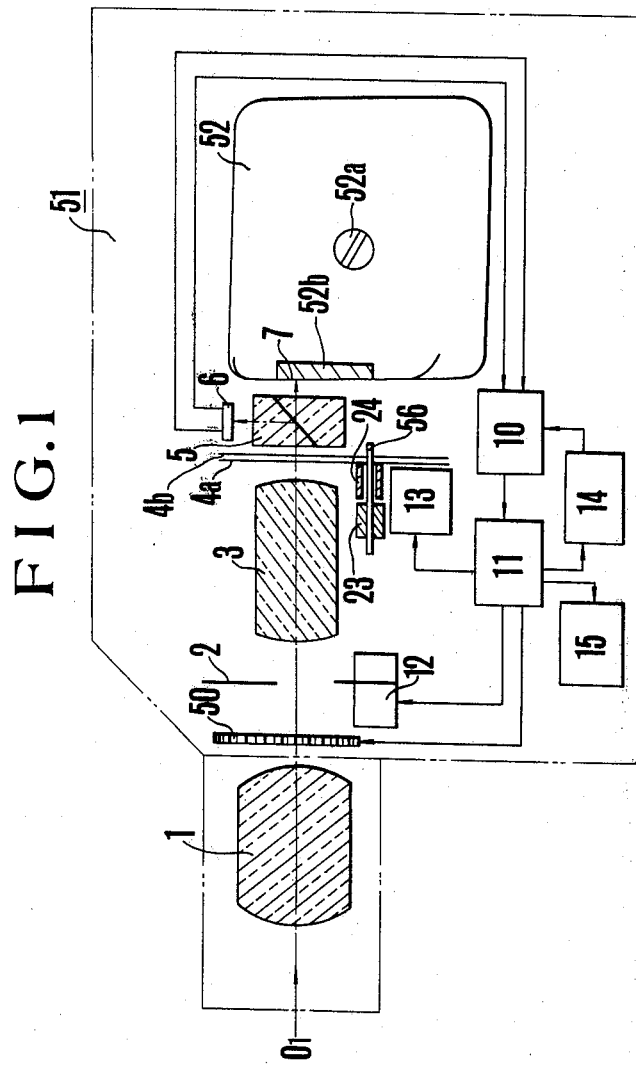
FIG. 1 shows the first embodiment of the motion picture camera presenting the automatic exposure adjusting device in accordance with the present invention, whereby the control circuit for operating the mechanism is shown in block diagram.
Figure 2:
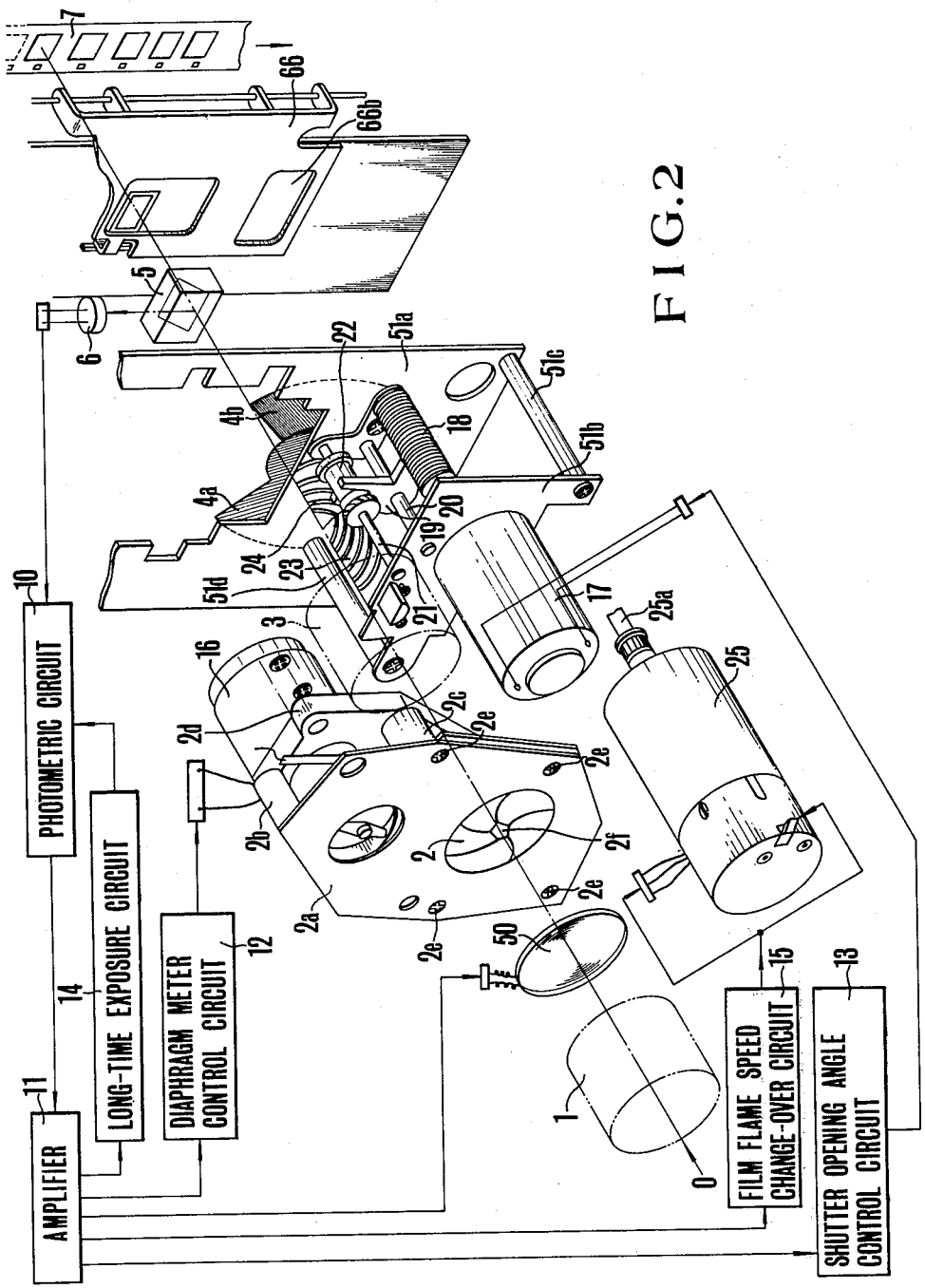
FIG. 2 shows only the elements necessary for the camera in FIG. 1 being put apart in perspective view together with the control circuit for operating the mechanism in block diagram.

FIG. 1 shows the first embodiment of the motion picture camera presenting the automatic exposure adjusting device in accordance with the present invention, while FIG. 2 shows only the elements necessary for the camera in FIG. 1 being put apart in perspective view together with the control circuit for operating the mechanism in block diagram.

In FIGS. 1 and 2, 51 is the camera body, 52 the film cartridge containing a film 7 and to be contained in the camera body, 1 the photographic lens, 2 the diaphragm blade for controlling the light having passed the photographic lens 1 before reaching the film plane, and 16 the diaphragm meter for controlling the diaphragm blade 2. 2a, 2b, 2c and 2d are the members for mechanically linking the diaphragm blade 2 with the diaphragm meter 16, so as to convey the output of the diaphragm meter to the diaphragm blade 2 in such a manner that the diaphragm blade 2 is controlld by means of the output of the diaphragm meter 16, whereby the first light amount control means consists of those members, the diaphragm blade 2 and the diaphragm meter 16. The detailed composition and operation of this first light amount control means is already disclosed in the U.S. Pat. No. 3,732,797 applied for patent by the inventors and registered as patent on May 15, 1973 in U.S.A. 3 is the relay lens, 5 the semipermiable prism and 6 the photovoltaic cell such as SPC. 50 is the denisty variable filter device presenting for example, a liquid crystal whose light permeability is variable in accordance with the output signal from the control circuit to be explained later, whereby the filter device composes a part of the second light amount control means.

The above mentioned optical elements of camera are so disposed that the light entering through the photographic lens 1 from the object travels through the filter device 50, the diaphragm opening 25 controlled by means of the diaphragm blade 2 and the relay lens 3 as shown with the optical axis to reach the semipermeable prism 5 and then is directed toward the photovoltaic cell 6 and the film 7 by means of the semipermeable prism 5.

4a is the first shutter blade member and 4b the second shutter blade member whereby the opening angle variable shutter blade 4 is composed of the combination of the first shutter blade memeber 4a and the second shutter blade member 4b while 51a, 51b 51c and 51d are the member composing the shutter opening angle adjusting mechanism holdng means for holding the shutter opening angle adjusting means for controlling the opening angle of the shutter blade 4 whereby 51a the front wall plate, 51b the rear wall plate, 51c and 51d the support members serving as spacers. 66 is the film feeding member normally mechanically linked with the shutter blade driving means for driving the shutter blade 4.

Below, the composition and the operation of the shutter opening angle adjusting means as well as the operational relation between the film feeding member 66 and the shutter opening angle adjusting means will be explained in detail in accordance with FIG. 3.

56 is the rotary shutter shaft rotatably born by means of the front wall plate 51a and the rear wall plate 51b while 57 is the spur wheel formed as one body with the rotary shutter shaft 56, whereby on a part of the spur wheel 57 a face cam 57a and a triangle cam 57b are provided. 23 is the first spiral wheel fixed on the shutter shaft 56 by means of a set screw 58. The first shutter blade member 4a is joined as one body with the spur wheel 57 by means of a joint member 55 in such a manner that the spur wheel 57 is rotatable as one body with the first shutter blade member 4a, the shutter shaft 56 and the first spiral wheel 23. 24 is the second spiral wheel rotatably provided on the shutter shaft 56, while 60 is the set screw serving to fix the spiral wheel on the bearing metal 59. 54 is the joint member for combining the shutter blade member 4b as one body with the second spiral wheel 24 in such a manner that the second shutter blade member 4b is rotatable as one body with the spiral wheel 24. The direction of the spiral of the first spiral wheel 23 is reversed to that of the spiral of the second spiral wheel 24. 25 is the first driving motor for producing a driving power for the mechanism elements of camera such as the zooming mechanism, the film winding up mechanism or the like, while 25a is the shaft of the motor 25. 61 is the spur wheel adapted on the motor shaft 25a, 63 the spur wheel adapted on the rotary shaft 62 rotatably born by means of the front wall plate 51a and the rear wall plate 51b whereby the spur wheel 63 is normally engaged with the spur wheels 61 and 57. In consequence when the motor 25 rotates, its driving power is transmitted to the spur wheel by means of the wheels 61 and 63 in such a manner that the shutter shaft 56 rotates. 21 is a shaft which is rotatably born by the front wall plate 51a and the rear wall plate 51b, whereby a wheel member presenting a wheel 22a with the screw thread in the one direction and a wheel 22b with the screw thread in the other direction is fixed on the shaft 21 while the wheel 22a is engaged with the wheel 23 and the wheel 22b with the wheel 24. The wheels 22a and 22b are so designed that when the motor shaft 56 rotates, the rotation of the motor shaft 56 is received by the wheel 22a through the wheel 23 and further transmitted to the wheel 24 through the wheel 22b in such a manner that the first shutter blade member 4a is rotated, while when the wheels 22a and 22b are translated along the direction of arrow in FIG. 2, by means of the gearing effect of the wheel 23 with the wheel 22a as well as of the wheel 22b with the wheel 24, the dispostion of the wheel 24 toward the wheel 23 on the shutter shaft along the radial direction is altered in such a manner that the shutter opening angle made with the first shutter blade member 4a and the second shutter blade member 4b is adjusted, whereby the adjusting means for adjusting this shutter opening angle is already disclosed in the U.S. Pat. No. 3,843,243 applied for patent by the inventors of the present invention and registered on Oct. 22, 1974 in U.S.A. 19 is the movement control member slidably arranged in the groove 22c of the wheel member 22 and intended to slide the wheel member 22 on the shaft 21 along the axial direction (along the direction of arrow). 17 is a reversible motor for adjusting the shutter blade opening angle whereby 17a is the motor shaft. The motor shaft 17a is rotatably born by means of the front wall plate 51a and the rear wall plate 51b, whereby the worm wheel 18 is rotatably arranged on the motor shaft 17a. 65 is a stopper member fixed on the motor shaft 17a while 64 is a friction spring provided between the worm wheel 18 and the stopper member 65 on the motor shaft 17. In consequence, the driving power of the motor 17 is transmitted to the worm wheel 18 by means of the friction of the spring 65. Further, the worm wheel 18 is normally engaged with the movement control member 19 in such a manner that when the worm wheel 18 rotates, the movement control member moves along an axial direction on the shaft 21 depending upon the rotation direction of the worm wheel 18, being guided by the screw thread of the worm wheel while during the slide movement the wheel member 22 is also translated on the shaft 21 along the axial direction so as to adjust the shutter opening angle. $S_1$ is the resetting switch corresponding to that in FIG. 5 to be explained later, being designed in such a manner that when the wheel member 22 is situated at the left end in the drawing, namely when the shutter opening angle is largest, the switch comes in contact with a part of the wheel member 22 so as to be actuated, whereby the switch $S_1$ is omitted in FIGS. 1 and 2. The film feeding member 66 presents a film feeding claw 66a for feeding the film intermittently to the film exposure opening (33 in FIG. 3), whereby the opening 66b is engaged with the triangle cam 57b while the contact part 66c is engaged with the face cam 57a in such a manner that when the wheel 57 rotates, the film is fed keeping a corelative relation with the covering operation of the film exposure opening by the shutter blade 4.

Below the operation of the shutter opening angle adjusting means and of the film feeding means will be explained in detail.

The shutter opening angle adjusting means and the filter device compose the second light amount control means whereby the filter device is used only when the brightness of the object is too high and is not always necessary so that in this meaning it can be said that the shutter opening angle adjusting means plays the most important role as the second light amount control means.

The principal member of the shutter opening angle adjusting means consists of the reversible motor 17, the worm wheel 18, the spring 64, the movement control member 19, the wheels 22, 23 and 24, the first blade member 4a, the second shutter blade member 4b and the shutter shaft 56.

When now the motor 17 is rotated by a certain determined amount in order to adjust the shutter opening angle formed by the first shutter blade 4a and the second shutter blade 4b, the worm wheel 18 is rotated by the driving power of the motor 17 through the spring 64. When the worm wheel 18 is rotated, the movement control member 19 in engagement with the worm wheel 18 is moved along a direction of arrow in the drawing depending upon the rotation direction of the worm wheel, whereby the wheel member 22 is translated on the shaft 21 along the axial direction. Because the dirrction of the screw thread of the wheel 23 is reversed to that of the screw thread of the wheel 24 while that of the screw thread of the wheel 22a is reversed to that of the screw thread of the wheel 22b, when the wheel member 22 is moved onthe shaft 21 along the axial direction, the correlative relation of the wheel 23 and of the wheel 24 toward the shutter shaft 56 along the radial direction is varied in such a manner that the correlative relation between the first and the second shutter blade member 4a and 4b is varied. Namely the shutter opening angle is varied.

Further the principal membe of the film feeding means consists of the motor 25, the spur wheel 61, 63 and 57, the shutter shaft 56, the wheels 23, 24, 22a and 22b, the face cam 57a, the triangle cam 57b and the film feeding claw member 66.

When the motor 25 rotates, the first and the second shutter blade member 4a and 4b are rotated in mutual cooperation by means of the driving power of the motor 25 through the wheel 61, 63 and 57, the shutter shaft 56 and the wheels 23, 22a, 22b and 24. Hereby the face cam 57a and the triangle cam 57b formed as one body with the wheel 57 are also rotated in such a manner that the film feeding operation of the film feeding claw member 66 engaged with the cams 57a and 57b is motivated so as to feed the film 7 to the exposure opening by a certain determined amount, keeping a certain determined correlative relation with the covering operation of the exposure opening by the shutter blade 4.

The block diagram shown in FIGS. 1 and 2 is a wiring diagram necessary for controlling the first light amount control means, the second light amount control means, the film feeding means and the like by a single photometric photoelectric converting element 6.

In the blockdiagram shown in FIGS. 1 and 2, 10 is the block diagram circuit presenting a photovoltaic element 6 as one part while 11 is the amplifier for amplifying the output of the photometric circuit 10, whereby the amplifier 11 is connected with the output terminal of the photometric circuit 10. 12 is the diaphragm meter control circuit being connected with the output terminal of the amplifier 11 whereby the output terminal of the diaphragm meter control circuit 12 is connected with the diaphragm meter 16 in such a manner that the diaphragm meter 16 is controlled by a signal in accordance with the output signal of the amplifier 11, so as to actuate the diaphragm blade 2. 13 is the shutter opening angle control circuit being connected with the output terminal of the amplifier 11, whereby the output terminal of the shutter opening angle control circuit 13 is connected with the motor 17 for adjusting the shutter opening angle, so as to control the driving of the motor 17. 14 is the long exposure time control circuit being connected with the output terminal of the amplifier 11, whereby the output terminal of the circuit 14 is connected with the photometric circuit 10 to be explained later. 15 is the film feeding speed switching over circuit being connected with the output terminal of the amplifier 11, whereby the output terminal of the circuit 15 is connected with the motor 25, so as to adjust the rotation speed of the motor in order to switch over the film feeding speed.

The detailed disposition of the blocks of the block diagram shown in FIGS. 1 and 2 will be explained in detail according to the accompanying FIGS. 4 and 5. Hereby, the outline of the motion picture camera presenting the automatic exposure adjusting device according to the present invention will be explained in accordance with the block diagram and table 1.

Table 1 shows the relation between the brightness of the object and the time at which the automatic exposure adjusting device shown in FIGS. 1 and 2 works. The photometric circuit can be adjusted in such a manner that a proper exposure is given to the film plane due to the light amount control by means of the diaphragm 2. Thus it is possible to make the adjustment in such a manner that for the range of the brightness of the object 40 cd/m² - 15000 cd/m² namely for the usual range of the brightness in day time no control signal is produced for the long time exposure circuit 14, the film feeding speed switching over circuit 15 and the filter device 50, that under the usual brightness the photometric system is only functionally engaged with the diaphragm blade 2 composing the first light amount control means and that the diaphragm blade 2 is actuated in accordance with the light amount detected by the photovoltaic element 6, of the object, giving always a proper exposure to the film plane so as to take a photograph according to the so called Servo-EE-System. The then shutter opening angle is the largest one, usually as large as 160°, whereby the time during which the exposure opening is not covered by the shutter blade 4 is given by the following equation;

$$T = \frac{1}{N} \times \frac{\theta}{360} \text{ (sec.)}$$

Hereby,
N = number of pictures intermittently fed in the exposure opening per second,
θ = shutter opening angle.
Thus in case the film is fed at a speed of 18 pictures/sec. and the shutter opening angle is 160°, $$T = \frac{1}{18} \times \frac{160}{360} \text{ (sec.)}$$

Further the largest shutter opening angle is designed optionally between 160° - 220°.

However, in case the brightness of the object is higher than 15000 cd/m² and it is impossible to make compensation so as to give a proper exposure to the film plane by means of the first light amount control means only even if the diaphragm of the first light amount control means is narrowed down to $F_{No}$ 32, the photometric circuit 10 detects the over-brightness of the object, gives a signal to the second light amount control means namely to the shutter opening angle control circuit 13 and the filter device 50, so as to make the shutter opening angle narrow in order to prolong the covering time of the exposure opening by the shutter blade 4, controlling the shutter opening adjusting means by means of the shutter opening angle control circuit 13, while the amount of the light coming from the object and passing through the filter device is decreased so as to give a proper exposure to the film plane. The time T during which in this case the exposure opening is not covered by means of the shutter blade 4 in case the film is fed at the speed of 18 pictures/sec.

$$T = \frac{1}{18} \times \frac{\theta}{360} \text{ (sec.)}$$

namely the time T is determined by the shutter opening angle θ.

On the other hand, in case the brightness of the object is lower than 40 cd/m² and it is impossible to give a proper exposure to the film plane during the time $$T = \frac{1}{18} \times \frac{160}{360} \text{ (sec.)}$$

during which the exposure opening is not covered by means of the shutter blade 4 even if the diaphragm of the first light amount control means is opened up to $F_{No}$ 1.4 (corresponding to the case the opening 2f formed by the diaphragm 2 is fully opened), the photometric circuit 10 detects the under brightness of the brightness of the object, gives a signal to the second light amount control means namely to the long time exposure circuit 14 and to the film feeding speed switching over circuit 15 so as to carry out the so called long time exposure photography automatically, by making the time during which the exposure opening is covered by means of the shutter blade 4 shorter and the time during which exposure opening is not covered by the shutter blade 4 longer in order to give a proper exposure to the film plane.

Figure 4A:
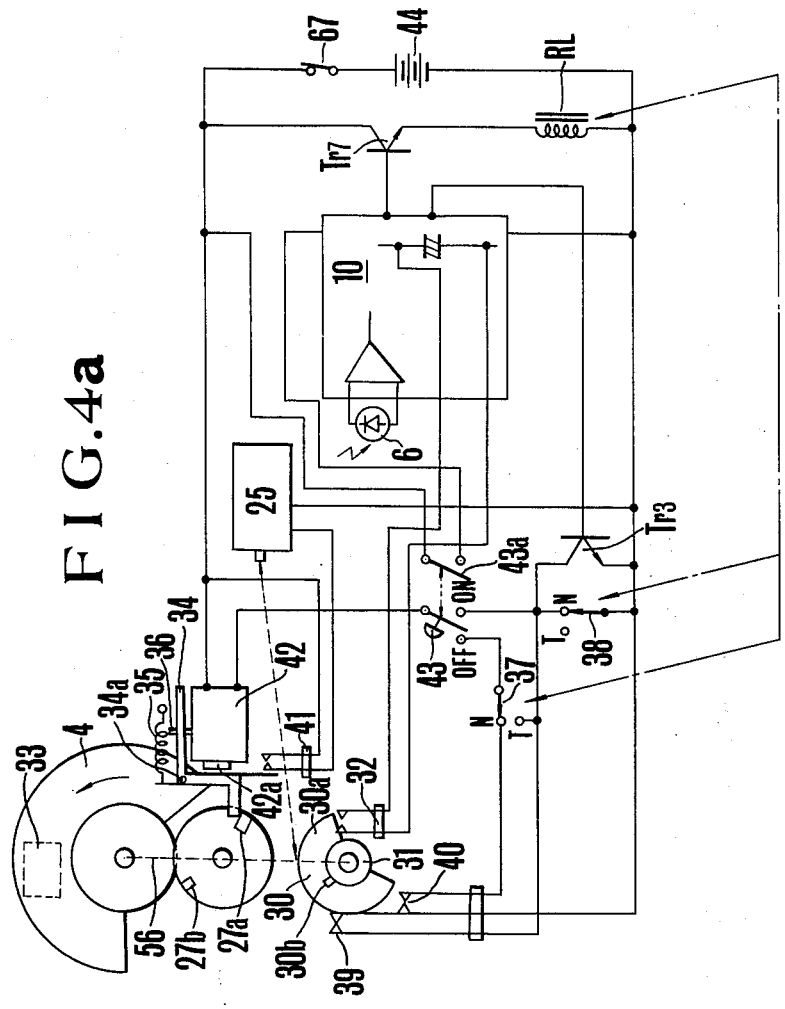
FIG. 4(a) shows the state in which the camera is out of operation.
Figure 4D:
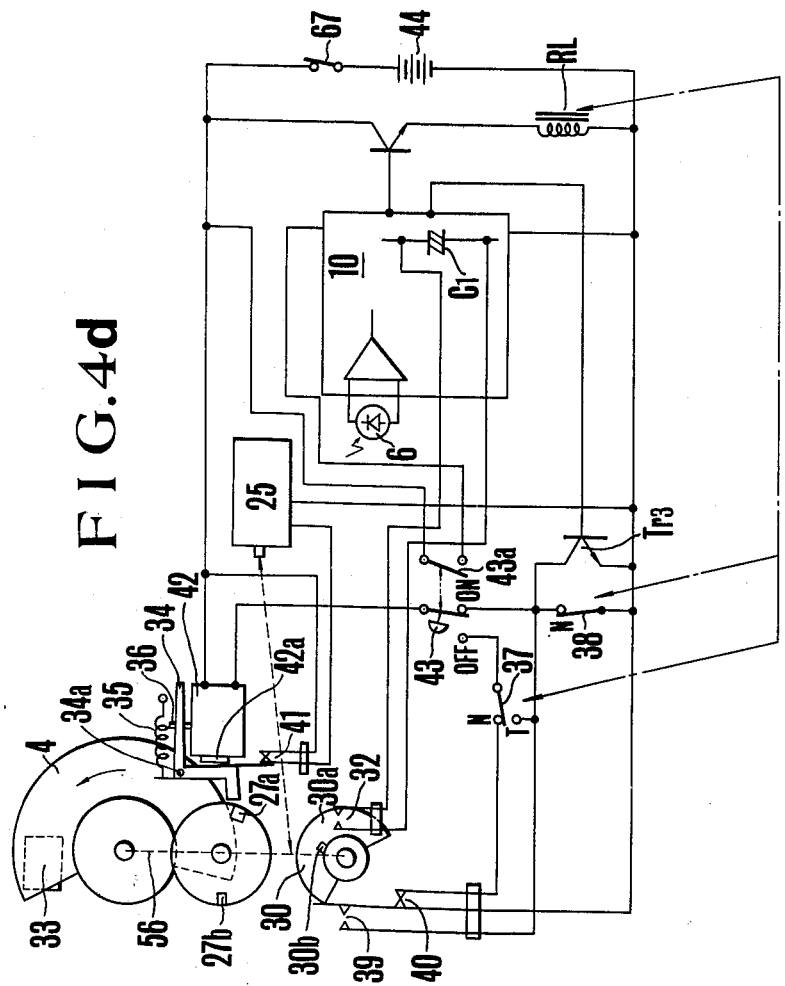
FIG. 4(d) shows the state on the way from the long exposure time photographing to the stop of the operation.

FIG. 4 shows the long time exposure circuit 14, the elements being controlled by means of the circuit 14 and necessary for the long time exposure photography and the electrical circuit for driving the elements for enabling the motion picture camera shown in FIGS. 1 and 2 to take the long time exposure photograph. They are usually arranged in the motion picture camera housing. In the drawing, the shutter blade 4 is shown with a single blade 4 for the sake of simplicity although the shutter blade 4 consists of the first shutter blade member 4a and the second shutter blade member 4b as is shown in detail in FIGS. 2 and 3. 27 is the stopper member presenting the projections 27a and 27b for stopping the shutter blade 4 at a certain determined position, whereby the stopper member is fixed on the shutter shaft 56 so as to be rotatable together with the shutter shaft 56, although the member 27 is not shown in FIGS. 2 and 3. 27a is the exposure opening covering stopper for stopping the shutter shaft 56 at the position at which the shutter blade 4 covers the exposure opening 33. 27b is the exposure opening disclosing stopper for stopping the shutter shaft 56 at the position at which the shutter blade 4 does not cover the exposure opening 33. 30 is the switch control cam plate presenting the switch opening closing cam faces 30a and 30b for controlling the opening and the closing of the swiches 39, 32 and 40, whereby the cam plate 30 is fixed on the shutter shaft 56 so as to be rotatable together with the shutter shaft 56 although the cam plate 30 is not shown in FIGS. 2 and 3. The opening and the closing of the switches 39 and 40 are controlled by means of the cam face 30a of the cam plate 30 while the opening and the closing of the switch 32 are controlled by means of the cam face 30b. 42 is the exciting magnet while 42a is the core to be magnetized by the magnetizing effect of the exciting magnet 42. 34 is the rotatable and translatable angle lever which can be rotated around the pin 34a as support point into a position at which the angle lever 34 engages with the projections 27a and 27b of the stopper member 27 and into another position at which the angle lever 34 does not engage with the projection 27a and 27b of the stopper member 27, whereby when the core 42a is magnetized the angle lever 34 is attracted toward the core 42a due to the magnetic effect so as to be placed at a position at which the angle lever 34 does not engage with the projections 27a and 27b of the stopper member 27, allowing the shutter shaft 56 to rotate, while when the core 42a is not magnetized, the angle lever 34 is translated into a position at which the angle lever 34 engages with either the projection 27a or the projection 27b of the stopper 27 so as to prevent the shutter shaft 56 from rotation. The spring 36 is intended to move the angle lever 34 to a position at which the angle lever 34 engages with the projection 27a and 27b of the stopper member 27 when the core 42a is not magnetized, whereby the position is determined by means of the stop screw 36. 43 is the release switch which is constructed as two step switch being functionally engaged with the switch 43a, whereby the switch 43a is intended to control the current supply to the timer circuit (shown in FIG. 5) for the long time exposure photography and constructed in such a manner that in order to prevent the first picture and the last picture at the termination of the long time exposure photography from becoming white (namely in order to make the shutter blade 4 stop at the position at which the shutter blade 4 covers the exposure opening 33 at the termination) the current supply switch 43a to the timer circuit is actuated in delay by a certain determined time so as to stop the operation of the release switch when the release is brought out of the switched-on state into the switched-off state (stop of the camera operation). 67 is the main switch, 44 the current source and 41 the switch to be opened and closed in functional engagement of the moving operation of the angle lever 34, whereby the switch 41 is switched on when the angle lever 34 is attracted toward the core 42a, switched off when the angle lever 34 is not attracted toward the core 42a and intended to control the switching on and off of the current supply to the driving motor 25. RL is the relay switch for controlling the switches 37 and 38, whereby the switch 37 is the mode switching over switch designed in such a manner that when the switch 37 is connected to the N side the ordinary photography is possible while when the switch 37 is connected to the T side the long time exposure photography is possible. 38 is the second mode switching over switch which is designed in such a manner that when the switch 38 is connected to the N side the ordinary photography is possible while the switch 38 is connected to the T side, the long time exposure photography is possible. Hereby both of the first mode switching over switch 37 and the second mode switching over switch 38 are connected to the N side when the relay RL is out of operation and to the T side when the relay RL is operated. $Tr_3$ is the switching transistor for controlling the current supply to the magnet 42, $C_1$ the condensor for controlling the operating time of the switching transistor $Tr_3$, whereby the switching transistor $Tr_3$ and the condensor $C_1$ are intended to carry out the release operation independent of the switching on and off of the release switch 43 during the long time exposure photography. Hereby the transistor $Tr_3$ is switched on when the condensor $C_1$ is loaded, and switched off as soon as the condensor $C_1$ has finished loading.

FIG. 5 shows an embodiment showing the detailed circuit arrangement of the block diagrams shown with the photometric circuit 10, the amplifier 11, the diaphragm meter control circuit 12, the shutter opening angle control circuit 13, the long time exposure circuit 14, the film feeding speed switching over circuit 16 or the like in FIGS. 1, 2, 3 and 4, whereby in FIGS. 1 to 4 the elements presenting the same figures are the same elements each other.

In the drawing, $OP_1$, $OP_2$, and $OP_3$ are the operation amplifiers composing the amplifier 11, $R_1$ is the standard potential setting resistance for setting the input standard potential to the operation amplifier $OP_1$, $OP_2$. the output load resistance for stabilizing the output of the operation amplifier $OP_1$ and $C_2$ the output load condensor also for stabilizing the output of the operation amplifier $OP_1$, whereby the photoelectric converting element 6, the resistances $R_1$ and $R_2$, the condensor $C_2$ and the operation amplifier $OP_1$ are the principal members composing the photometric circuit 10. $D_1$, $D_2$, $D_3$ and $D_4$ are the diodes being intended to determine +Vth voltage and −Vth voltage of the operation amplifier $OP_2$. $R_3$ and $R_4$ are the resistances being intended to determine the amplification factor of the operation amplifier $OP_2$ within the linear range between −Vth and +Vth voltage and to carry out a negative feed back. $R_5$, $R_6$ and $R_{11}$ are the resistances composing a positive feed back circuit for the operation amplifier $OP_2$, so as to make the positive feed back amount larger than the negative feed back amount by means of the resistances $R_3$ and $R_4$. Further, the resistance $R_{11}$ serves also as the protection resistance for preventing the output of the operation amplifier $OP_2$ from short circuiting when the transistors $Tr_4$ and $Tr_5$ are operated by the output. $C_5$ is the condensor, $R_7$ the discharging resistance of the condensor $C_5$. $R_8$ is the resistance for determining the base potential of the transistor $Tr_5$, $R_9$ is the resistance for limiting the base current of the transistor $Tr_5$, $R_{12}$ the resistance for limiting the sensibility of the meter 16, $D_7$ and $D_8$ the diodes for protecting the meter 16 and $R_{10}$ the resistance for limiting the base current of the transistor $Tr_4$, whereby the resistances $R_3$, $R_4$, $R_5$, $R_6$, $R_7$, $R_8$, $R_9$, $R_{10}$, $R_{11}$, and $R_{12}$, the diodes $D_1$, $D_2$, $D_3$, $D_4$, $D_7$ and $D_8$, the transistors $Tr_4$ and $Tr_5$, the meter 16, the switch S, the diaphragm meter 16 and the operation amplifier $OP_2$ are the principal members composing the diaphragm meter control circuit 12.

$Tr_7$ is a transistor, $R_{13}$ is the resistance for limiting the base current of the transistor $Tr_7$, $D_9$ and $D_{10}$ respectively a diodes for shifting the input voltage of the transistor $Tr_7$. $Tr_8$ is a transistor, $R_{14}$ the resistance for limiting the base current of the transistor $Tr_8$, $D_{11}$ and $D_{12}$ respectively a diode for shifting the base input voltage of the transistor $Tr_8$, $Tr_{20}$ a transistor, ZD is a Zener diode for determining the base current for switching off the transistor when the transistor $Tr_8$ is switched on, $R_{27}$ the resistance presenting a large resistance value for determining the idling current of the transistor $Tr_6$ and $VR_1$ a variable resistance for the information such as of the film sensibility for determining the charging current of the condensor $C_1$, so as to determine the integrating time. $R_{28}$ and $R_{29}$ are the resistances for stabilizing the input of the operation amplifier circuit $OP_4$, $R_{34}$ the resistance for determining the base voltage of the transistor $Tr_3$, $R_{35}$, $R_{36}$, $R_{37}$ and $R_{38}$ the resistances, $C_5$ a condensor, $R_{17}$ the resistance for stabilizing the input of the operation amplifier $OP_3$, $R_{15}$ and $R_{16}$ the resistance for determining the amplification ratio of the operation amplifier $OP_3$ and $R_{18}$ the resistance for determining the output of the operation amplifier $OP_3$. Hereby the operation amplifier $OP_3$, the resistances $R_{13}$, $R_{14}$, $R_{15}R_{16}$, $R_{17}$, $R_{18}$, $R_{19}$, $R_{20}$, $R_{21}$, $R_{23}$ and $R_{24}$, the transistor $Tr_1$ and $Tr_2$, the field-effect transistor FET, the diodes $D_5$ and $D_6$, and the motor 17 are principal element for composing the shutter opening angle control circuit 13.

G is the gate circuit, while $OP_5$ the operation amplifier circuit. $R_{33}$ is a resistance while $C_4$ is a condensor whereby the resistance $R_{33}$ and the condensor $C_4$ compose an integrating circuit for producing the standard pulse signal. $D_{14}$ is the diodes for controlling the negative input voltage of the operation amplifier circuit $OP_5$. $D_{13}$ is a diode while $R_{32}$ is a resistance whereby the diode $D_{13}$ and the resistance $R_{32}$ compose a circuit for discharging the condensor $C_4$. RL is the relay shown in FIG. 4. The gates circuit G, the resistances $R_{30}$, $R_{31}$, $R_{32}$ and $R_{33}$, the operation amplifier circuit $OP_5$, the diodes $D_{13}$, $D_{14}$ and $D_{16}$, the condensors $C_3$ and $C_4$ and relay RL are the principal elements for composing the time comparison circuit of the long time exposure device 14.

The operation of the motion picture camera equiped with the automatic exposure adjusting device in accordance with the present invention will be explained below according to FIGS. 1 to 4.

The photoelectric converting element 6 is disposed behind the relay lens 3, the diaphragm blade 2 and the shutter blade 4 shown in FIGS. 1 and 2 inside of the motion picture camera body equiped with the device according to the present invention in such a manner that the photoelectric converting element 6 receives the light beam split by means of for example, a semipermeable prism, of the object. As photovoltaic element 6 a photosensitive element such as SPC is made use of, whereby its both ends are the input of the operation amplifier 1 whose output is amplified by means of the operation amplifier 2, so as to drive the diaphragm meter 16 in such a manner that the diaphragm blade 2 is narrowed to alter the light amount entering into the light receiving plane of the photvoltaic element 6 as well as the film plane, which is the so called light amount feed back type exposure control mechanism according to servo-EE system. The operation range of the diaphragm blade 2 covers from the fully opened aperture to the smallest aperture for keeping the image efficiency. For the control range beyond that by means of the diaphragm blade 2, the diaphragm meter 16 indicates whether the range is too high or too low. At this time, by means of the diodes $D_1$, $D_2$, $D_3$ and $D_4$ supplied with the output of the operation amplifier $OP_2$ which amplifies the output of the operation amplifier $OP_1$, the diaphragm meter 16 is electrically locked, so as to be kept at the smallest aperture side or at the fully opened aperture side. By bringing the field-effect transistor $FET_1$ into the conductive state and making the voltage between the diodes $D_5$ and $D_6$ vary by means of the output amplified by means of the operation amplifier $OP_3$, $Tr_1$ and $Tr_2$ are selectively actuated so as to determine the direction of the rotation of the opening angle adjusting motor. By means of the rotation driving of the opening angle adjusting motor 17 the opening angle of the shutter blades 4a and 4b is varied through the opening angle adjusting device shown in FIGS. 1, 2 and 3 so as to vary the exposure time to the film plane and the photovoltaic element 6 in such a manner that the exposure amount on the film plane and the photovoltaic element 6 is controlled by the feed back control principle. In order to switch the photography by thus adjusting the opening angle of the shutter blade over into the ordinary photography the switch $S_1$ shown in FIGS. 3 and 5 is closed when the opening angle of the shutter blades 4a and 4b becomes largest by means of the axially slidable claw 19 shown in FIGS. 1 and 2 due to the driving of the opening angle adjusting motor 17. By closing the reset switch $S_1$ shown in FIGS. 3 and 5, the electrically locked diaphragm meter 16 is released in such a manner that the shutter opening angle is largest and the ordinary photography by the diaphragm control is possible.

When the diaphragm blade 2 is brought into the fully opened state in the exposure meter for servo EE photography the long time exposure photographing mechanism transfer the output of the operation amplifier $OP_2$ by making use of the diodes $D_3$ and $D_4$, so as to electrically keep the diaphragm meter 16 and the diaphragm blade 2 in the fully opened state while the transistor $Tr_{20}$ is switched off so as to start charging the condensor $C_2$. The terminal voltage of the condensor $C_1$ is put in the input terminal of the operation amplifier $OP_4$ and when a certain voltage determined by the variable resistance VR is reached the transistor $Tr_3$ is actuated by the output of the operation amplifier $OP_4$. The collector of the transistor $Tr_3$ is connected with the magnet relay as is shown in FIG. 4 so as to govern the release operation during the long time exposure photography. The charging current of the condensor $C_1$ is controlled by the current between the base and the emitter of the transistor $Tr_6$, while the base voltage of the transistor $Tr_6$ is adjusted by means of the output of the operation amplifier 3 into which the light beam entering into the photosensing element 6 is put as information input. Thus the charging velocity of the condensor $C_1$ is varied in accordance with the brightness of the object so as to detect the time until the transistor $Tr_3$ is switched on by means of the operation amplifier $OP_4$. This is the exposure time per one picture for the long time exposure photography. Further, parallel to the condensor $C_1$ a switch 32 is provided in such a manner that the switch 32 short circuits the voltage between the both terminals of the condensor $C_1$ once for each rotation of the cam arranged on the shutter shaft. Thus the long time exposure for one picture is terminated whereby at the same time with the driving of the release device the shutter shaft is rotated a new film for the next picture is brought to the picture window by means of a feeding device not shown in the drawing while at the same time, the terminal voltage of the condensor for determining the exposure time is short circuited so as to make preparation for determining the exposure time for the new picture.

The long time exposure photography is automatically switched over into the ordinary photography by means of the above memtioned diaphragm control by comparing the exposure time set in advance by means of the operation amplifier $OP_5$ and the AND gate G with the exposure time for the long time exposure in such a manner that when the exposure time overlaps with the time set in advance, the transistor $Tr_4$ is switched one so as to release the electrically locked diaphragm meter 16, to return the transistor $Tr_2$ in the switched on state and to bring the diaphragm meter 16 in the operatable state.

By manually opening the switch $S_3$ in the circuit of the shutter opening angle adjusting device shown in FIG. 5 the functional engagement of the photometric system with the shutter opening angle adjusting mechanism is released so as to enable the manual setting of the shutter opening angle. By manually connecting this three contact switch $S_3$ to the OPEN side or to the CLOSE side either the transistor $Tr_1$ or the transistor $Tr_2$ is selected so as to change the direction of the rotation of the opening angle adjusting motor in such a manner that the shutter opening angle can be optionally adjusted by means of the opening angle adjusting device shown in FIGS. 1, 2 and 3.

So far mainly the operation of the electrical circuit diagram shown in FIG. 5 is explained, while below the operation of the members for the long time exposure photography and that of the electrical circuit diagram for driving the members will be explained according to FIG. 4.

FIG. 4(a) shows the state in which the motion picture camera is out of operation, whereby the release switch 43 is put on the switched off side, the switch 43 on the switched off side, the switches 41, 32 and 40 on the switched off side, the switch 39 on the switched on side, the switches 37 and 38 connected with the contact at N side while the stopper 27a is engaged with the angle lever 34 and the shutter blade 4 covers the exposure opening 33.

When then the release switch 43 is switched on, the switch 43a is also switched on whereby in case the brightness of the object measured by the photometric circuit 10 is within the control range by means of the diaphragm blade 2, the ordinary time exposure photographing signal is produced by the photometric circuit in such a manner that the transistor $Tr_7$ is in the switched off state, while the relay RL is in the unoperatable state. In consequence the switches 37 and 38 are connected with the N contact.

In this state, the current from the electric source 44 runs through the main switch 67, the magnet 42, the release switch 43 and the switch 38. At this time, the magnet 42 is excited due to the current running through the magnet 42 and the angle lever 34 is attracted by the core 42a in such a manner that due to the movement of the angle lever 34 the switch 41 is switched on, the current is supplied to the driving motor 25, so as to drive the shutter blade 4, whereby the ordinary photographing is carried out.

When then the brightness of the object measured by the photometric circuit 10 is remarkably low, the long time exposure photographing signal is produced by the photometric circuit 10, whereby the transistor $Tr_7$ is brought in the switched on state. When the transistor $Tr_7$ is switched on, the current from the current source 44 is supplied to the relay RL through the main switch 67 and the transistor $Tr_7$, so as to actuate the relay RL. When the relay is actuated the switches 37 and 38 are connected with T contact due to the operation of the relay RL. At this time, the switch 38 is in the switched off state (FIG. 3(b)).

In consequence, the current supply to the magnet 42 is interrupted, the angle lever 34 is moved toward the stopper member 27, so as to engage with the projection 27a of the stopper member 27, whereby the shutter blade 4 stops, covering the exposure opening 33. In this state, the switches 32, 39 and 41 as well as the transistor $Tr_3$ are switched off, while the switch 40 is switched on whereby the transistor $Tr_3$ is brought in the conductive state as soon as the condensor $C_1$ has been charged.

When in this state, the release switch 43 is kept switched on, the supply current from the current source 44 runs through the main switch 67, the magnet 42, the release switch 43, the switch 37 and the transistor $Tr_3$. In consequence, the magnet 42 is excited, the core 42a attracts the angle lever 34, so as to release the engagement of the projection 27a of the stopper member 27 with the angle lever while the switch 41 is brought in the switched on state due to the movement of the angle lever. Thus, the driving motor 25 starts to rotate to drive the shutter shaft 56 (FIG. 4(c) ). When the shutter shaft 56 is rotated and the switch 32 is brought in the switched on state by means of the cam face 30b of the cam plate 30, the current charged in the condensor $C_1$ is discharged, the transistor $Tr_3$ is brought in the non conductive state, the supply current to the magnet is interrupted and the core 42a is no more magnetized in such a manner that the angle lever 34 is moved toward the stopper member 27 due to the strength of the spring 35, so as to engage with the projection 27b of the stopper member 27 whereby the shutter blade 4 stops at the position at which the shutter blade 4 does not cover the exposure opening 33. Because in this state the switch 41 is free from the effect of the angle lever 34, the switch 41 remains in the switched off state so that the supply current to the driving motor is interrupted (FIG. 4(b) ).

When then the condensor $C_1$ whose charge has been discharged because the switch 32 was brought in the switched on state by means of the above mentioned cam 30b is charged from the beginning, the transistor $Tr_3$ is brought in the conductive state in such a manner that the supply current from the current source 44 runs through the main switch 67, the magnet 42, the release switch 43, the switch 37 and the transistor $Tr_3$, so as to drive the motor 25 and therefore the shutter shaft. When the condensor $C_1$ is charged again the transistor $Tr_3$ is brought in the switched off state, whereby as mentioned above the shutter blade 4 stops at a position at which the shutter blade 4 does not cover the exposure opening. Namely, the long time exposure photographing is carried out quite independent of the release switch whereby the time is controlled by the condensor $C_1$ and the transistor $Tr_3$.

Because the release switch 43 and the switch 43a are formed as two step switches, when the release switch 43 is returned by one step in order to stop the long time exposure photographing, the release switch 43 still remains in the switched on state while the switch 43a is brought in the switched off state and the transistor $Tr_7$ is switched off, so as to bring the relay RL out of operation, whereby the switches 37 and 38 are connected with the N contact. The then supply current from the current source 44 runs through the main switch 67, the exciting coil 42, the release switch 43 and the switch 38, keeping the coil 42 in the excited state in such a manner that the angle lever 34 is arranged at a position at which the angle lever 34 does not engage with the projections 27a and 27b, leaving the switch 41 in the switched on state whereby the motor 25 is running. However, in this state, the switch 43a is in the switched off state due to the return of the release switch 43 by one step the photometric circuit 10 is out of operation independent of the brightness of the object. Because when the shutter blade 4 does not cover the exposure opening, the switch 40 is at the position at which the switch 40 is free from the effect of the cam face 30a of the cam plate 30 and is in the switched on state, the supply current from the current source 44 runs through the main switch 67, the exciting coil 42, the release switch 43 and the switches 37 and 40 when the release switch 43 is returned by further another step so as to be connected with the OFF contact, whereby the exciting coil 42 is still in the excited state, while the motor circuit 25 is also still in the switched on state. When then the motor shaft 56 rotates further so as to open the switch 40 by means of the cam face 30a of the cam plate 30, the supply current to the exciting coil 42 and to the motor circuit 25 is interrupted in such a manner that the angle lever 34 engages with the projection 27a whereby the shutter blade 4 stops at the position at which the shutter blade 4 covers the exposure opening 33. Namely, the photographing is terminated.

Figure 6:
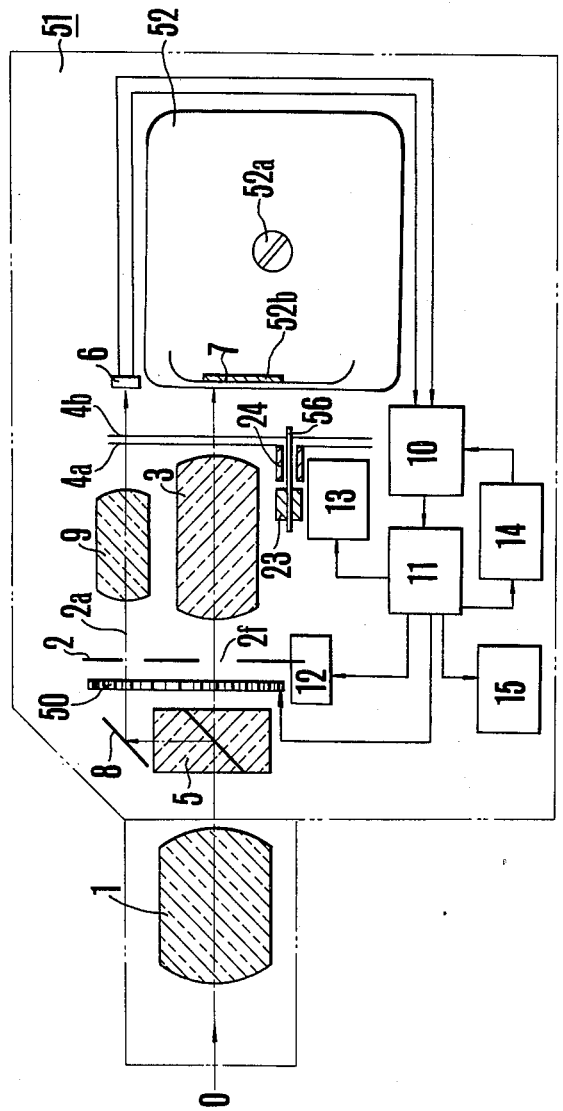
FIG. 6 shows a variation of the motion picture camera shown in FIG. 1 as the second embodiment of the present invention.
Figure 7:
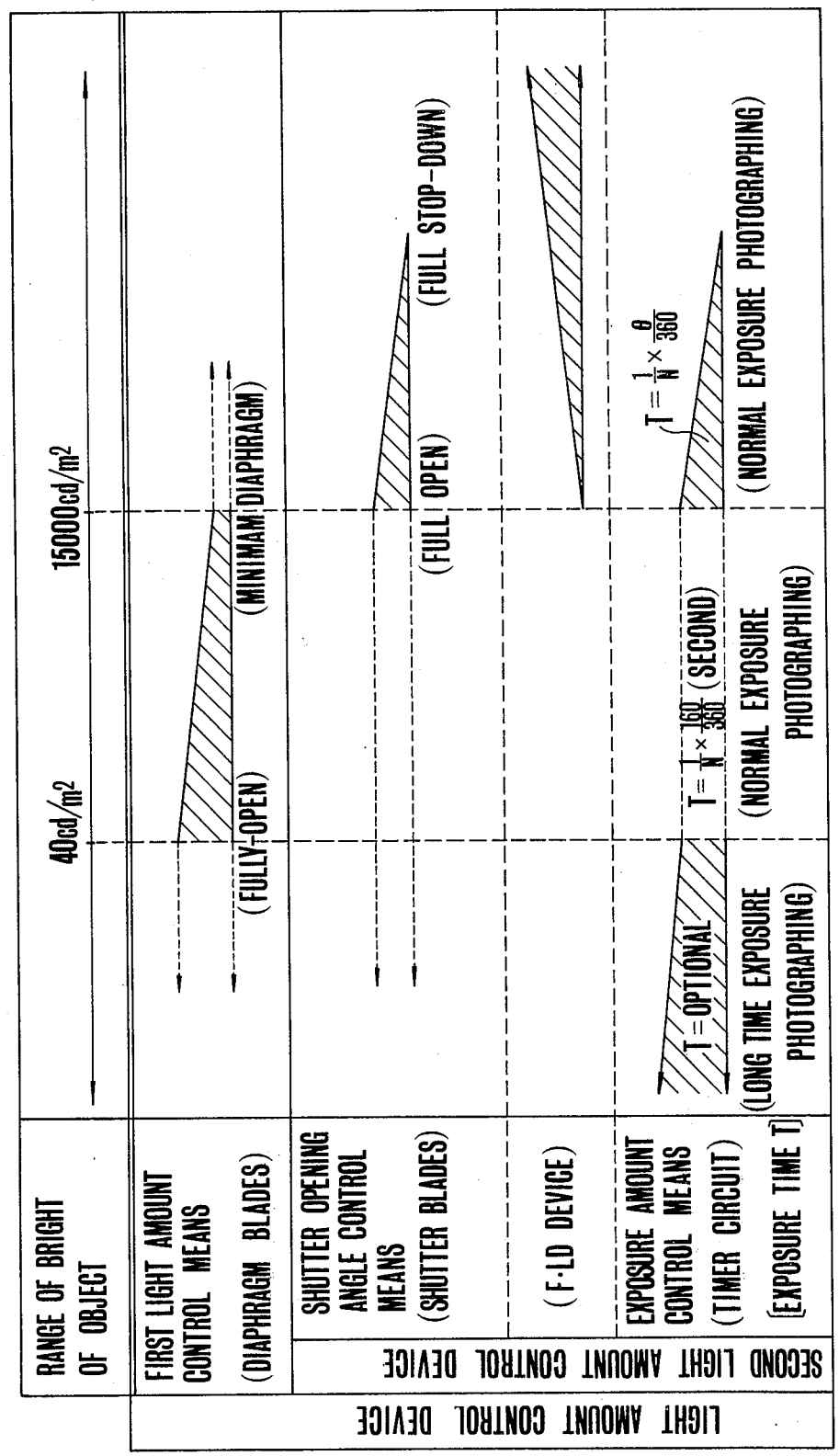

FIG. 6 shows a variation of the motion picture camera shown in FIG. 1 as the second embodiment, whereby the arrangement of the optical system and of the photometric system is varied while the control circuit is same as that shown in FIGS. 1 to 5 and the functions of the elements presenting the same figures are same as those of the elements shown in FIGS. 1 to 5.

In FIG. 6, between the photographic lens 1 and the shutter blade 2 a semipermeable prism 5 is provided so as to split the light beam whereby a part of the light beam is refracted by means of a mirror 8 and reaches the photovoltaic element 6 provided at a position corresponding to the film plane through the photometric aperture 2, the relay lens 9 and the shutter blade 4. By means of the photometry at the above mentioned position the informations such as diaphragm value, the exposure time and so on produced by the light amount control device under the same condition on the film face can be detected in such a manner that various kinds of the light amount adjusting devices can be controlled and operated by means of a photometric circuit. Namely, the output of the photometric circuit 10 presenting a photovoltaic element 6 is put in the amplifier 11 according to whose output the operation and control as well as the switching of the diaphragm meter 12, the shutter opening angle control device 13, the film feeding speed switching over device 15 and the long time exposure device 14 are carried out. Further it is possible to design in such a manner that when the brightness of the object is too high the output of the above mentioned amplifier circuit 11 is supplied to the density variable filter inserted in the photographic optical path so as to lower the brightness so as to adjust the light permeability of the filter in accordance to the output of the amplifier circuit 11 and give a proper exposure to the film plane 7.

In the present embodiment as the element 6 for photometry a photovoltaic element is made use of, whereby it is not always necessary to apply the photovoltaic element but a photoelectric converting element such as CdS can also be applied.

As so far explained according to the present invention, the second light amount control means of the exposure time adjusting means such as the light amount adjusting means like diaphragm blade and filter, the film feeding speed switching over means and the shutter opening angle adjusting means is operated by means of the output of the photometric means presenting a photoelectric converting element built in the motion picture camera so that over a wide photographing range an automatic exposure adjustment can be carried out without the operation of the photographer himself, while when the brightness of the object is too low, a long time exposure device can be controlled by the same photoelectric converting means whereby it is not necessary to operate another photoelectric converting element for the long time exposure photography, which is very profitable. Further, by releasing the functional engagement with the photometric device, it is possible to manually operate the above mentioned second light amount control means as device for producing various kinds of trick effect, which adds much to the interest of taking a motion picture.

What is claimed is:

1. In an automatic exposure adjusting device, an improvement comprising:
    1. photometric means which receives light corresponding to the quantity of light incident upon an exposure surface and produces an electric output signal corresponding to the quantity of the received light; and
    2. controlling means whereby the quantity of light incident upon said exposure surface is controlled to be a preset quantity of light, said controlling means having the following component parts disposed in the path of the incident light coming from a photographing object:
        a. a first light amount regulating means which is activated when the output of said photometric means is not within a preset range of levels so as to control the quantity of light coming from the photographing object through said path of light and which is connected to the output terminal of said photometric means; and
        b. a second light amount regulating means which is also connected to the output terminal of said photometric means and effectively operates when the output of the photometric means is within said preset range of levels so as to permit control over a broader range of exposure adjustment.

2. A device as defined in claim 1, wherein said photometric means which receives the light of the photographing object comprises photo-electric converting means which produces an electric output signal corresponding to the quantity of the light received; reference signal input means for producing a reference signal with which the output of said photo-to-electric converting means is to be compared; and comparing means which compares the output signal of said photo-electric converting means with the output signal of said reference signal input means to produce an output signal corresponding to the difference between the two output signals compared.

3. A device as defined in claim 2, said photo-electric converting means being located at a point where said means can receive the light of the photographing object after the light has passed through said first and second light amount regulating means.

4. A device as defined in claim 2, said reference signal input means being provided with reference signal level selecting means which permits selection of a reference signal level as desired.

5. A device as defined in claim 1, said second light amount regulating means being provided with filtering means which permits adjustment of light transmittance thereof according to impressed voltage.

6. A device as defined in claim 1, said second light amount regulating means being provided with shutter means which selectively blocks the light incident upon said exposure surface and controlling means which releases said shutter means according to the output of said photometric means and which electrically controls the length of time during which said shutter means is kept released from a state of blocking the incident light.

7. In a photographic camera, an improvement comprising:
  1. image forming optical means for forming an image on an image forming surface;
  2. photometric means which receives light incident upon said image forming surface and is provided with photo-electric converting means for producing an electric output signal corresponding to the quantity of the light received; and
  3. exposure controlling means for adjusting to a preset quantity the quantity of the incident light to which an exposure surface is to be exposed, said exposure controlling means including the following components disposed in a path of light of said image forming optical means:
     a. a first light amount regulating means which is activated to control the quantity of light of the photographing object passing through said path of light of the image forming optical means when the output of said photometric means is not within a preset range of levels, the first light amount regulating means being responsive to the output of said photometric means; and
     b. a second light amount regulating means which effectively operates when the output of said photometric means is within the preset range of levels, said second regulating means being provided with:
        i. a diaphragm means for controlling the quantity of light of the photographing object passing through the path of light of said image forming optical means; and
        ii. diaphragm controlling means for controlling said diaphragm means, said diaphragm controlling means being responsive to the output signal of said photometric means while the output of said diaphragm controlling means is coupled to the input terminal of said diaphragm means.

8. A camera as defined in claim 7, said photometric means including a semipermeable prism means for dividing the light which has passed through said image forming optical means at least in two different directions, one of the divided lights being directed to said image forming surface and the other divided light to said photo-electric converting means.

9. A camera as defined in claim 7, said photometric means including reference signal input means for producing an electric reference signal to be compared with the output of said photo-electric converting means and comparing means which compares the output signal of said photo-electric converting means with the output signal of said reference signal input means to produce an output signal corresponding to the difference between these two compared output signals.

10. A camera as defined in claim 9, said reference signal input means being provided with reference signal level selecting means which permits selection of a reference signal level as desired.

11. A camera as defined in claim 7, said first light amount regulating means being provided with filtering means which permits adjustment of light transmittance thereof according to impresed voltage.

12. A camera as defined in claim 7, said first light amount regulating means being provided with shutter means which selectively blocks the light incident upon said exposure surface and controlling means which releases said shutter means according to the output of said photometric means and electrically controls the length of time during which said shutter means is kept released from a state of blocking the incident light.

13. In a motion picture camera, an improvement comprising:
  1. photographic optical means;
  2. intermittent film feeding means which intermittently feed a film;
  3. rotary shutter means which selectively blocks the light of a photographing object incident upon the surface of the film relative to said intermittent film feeding means;
  4. driving means for driving said intermittent film feeding means and said rotary shutter means;
  5. photometric means which receives light corresponding to the quantity of the light of the photographing object incident upon the film surface and is provided with a photo-electric converting means which produces an electric output signal corresponding to the received light; and
  6. exposure controlling means for adjusting the quantity of light to which the film is to be exposed to a preset quantity of light, said exposure controlling means including the following:
     a. first light amount regulating means which effectively operates when the output of said photometric means is within a preset range of levels, the first light amount regulating means comprising:
        i. a diaphragm which is disposed in a path of light of said photographic optical means for the purpose of controlling the quantity of the light of the photographing object passing through the optical means; and
        ii. diaphragm controlling means which controls said diaphragm according to the output of said photometric means;
     b. second light amount regulating means which is activated when the output of said photometric means is not within the preset range of levels, the second regulating means comprising:
        i. exposure time adjusting means which permits adjustment of the length of time allowed by said rotary shutter means for the incidence of the light of the photographing object upon the image forming surface of the film; and ii. exposure time determining means for determining the exposing time of said rotary shutter means controlled by said exposure time adjusting means.

14. A camera as defined in claim 13, wherein said exposure time adjusting means is provided with blocking means which retains said rotary shutter means in a position at which the rotary shutter means allows the incidence of the light of the photographing object upon the film and the length of time during which said rotary shutter means is retained in said position is controlled by said exposure time determining means.

15. A camera as defined in claim 14, said blocking means being provided with cam means, actuating means which selectively engages with and disengages from said cam means and magnetic exciting means which controls the operation of said actuating means, the blocking means being arranged so that said cam means is secured to said rotary shutter means to rotate herewith in one united body and said blocking means can be shifted between first and second positions, and, in the first position, the blocking means acting to block the rotation of said rotary shutter means by engaging with the cam means and, in the second position, blocking means disengaging from the cam means to allow the rotary shutter means to rotate.

16. A camera as defined in claim 13, said exposure time determining means having a resistance-capacitance constant circuit which is connected to said photo-electric converting means.

17. A camera as defined in claim 13, wherein said rotary shutter means has first and second shutter members overlapping each other and said exposure time adjusting means is provided with means for adjusting the shutter opening angle formed by the first and second shutter members.

18. A camera as defined in claim 13, wherein said photometric means has reference signal input means for producing a reference electric output signal to be compared with the output of said photo-electric converting means and comparing means which compares the output signal of the photo-electric converting means with the output signal of the reference signal input means and produces an output signal corresponding to the difference between the two output signals compared.

19. A camera as defined in claim 18, said reference signal input means being provided with reference signal level selecting means which permits shifting the reference signal level as desired.

20. A camera as defined in claim 13, wherein at least either one of said first and second light amount regulating means is manually controllable irrespective of the output of said photometric means.

21. In a motion picture camera, an improvement comprising:
 1. photographing optical means;
 2. intermittent film feeding means which intermittently feed a film;
 3. rotary shutter means which selectively blocks the light of a photographing object incident upon the film, the rotary shutter means operating relative to the operation of said intermittent film feeding means;
 4. driving means which actuate at least said intermittent film feeding means and said rotary shutter means;
 5. blocking means which selectively blocks the rotation of said rotary shutter means, the blocking means being provided with:
   a. cam means for keeping said rotary shutter means stationary at a position in which the incidence of the light of the photographing object upon the film is allowed, the cam means being secured to the rotary shutter means to rotate with it in one united body;
   b. actuating means which can be engaged with and disengaged from said cam means, the actuating means having a first position in which the actuating means enters the locus of rotation of the cam to stop said rotary shutter means at said incident light allowing position and a second position in which the actuating means retreats from the locus of rotation of the cam means to allow the rotary shutter means to rotate so as to block the incidence of the light of the photographing object upon the film, the actuating means being shiftable between the first and second position; and
   c. magnetic exciting means for controlling the shift of said actuating means from one position to the other;
 6. photometric means which receives light corresponding to the quantity of light of the photographing object incident upon the surface of the film coming through said photographic optical means and which is provided with photo-electric converting means for producing an electric output signal corresponding to the quantity of the light received; and
 7. exposure controlling means for adjusting the quantity of light to which the film is to be exposed to a preset quantity of light, said exposure controlling means including the following:
   a. first light amount regulating means which effectively operates when the output of said photometric means is within a preset range of levels, the first light amount regulating means comprising:
    i) a diaphragm which is disposed in a path of light of said photographic optical means for the purpose of controlling the quantity of the light of the photographing object passing through the optical means; and
    ii) diaphragm controlling means which controls said diaphragm according to the output of said photometric means;
   b) second light amount regulating means which is activated when the output of said photometric means is not within the preset range of levels, the second regulating means comprising:
    i) pulse generating means which generates a pulse signal for exciting said magnetic exciting means; and
    ii) time determining means which controls the time intervals at which pulses are generated by the pulse generating means.

22. A camera as defined in claim 21, said time determining means having a resistance-capacitance time constant circuit which is connected to said photo-electric converting means.

23. A camera as defined in claim 21, said photometric means comprising reference signal input means which produces a reference electric output signal to be used for comparison with the output of said photo-electric converting means and comparing means which compares the output of the photo-electric converting means and the output of said reference signal input means and which produces an output signal corresponding to the difference between these two output signals compared.

24. A camera as defined in claim 23, said reference signal input means provided with reference signal level selecting means by which the reference signal level can be shifted to a desired level.

25. In a motion picture camera, an improvement comprising:
1. photographic optical means;
2. intermittent film feeding means for intermittently feeding a film;
3. rotary shutter means which selectively blocks the light of a photographing object incident upon the film relative to the operation of the intermittent film feeding means, the rotary shutter means comprising at least first and second shutter members which forms an aperture for allowing the incidence of the light of the photographing object upon the film;
4. driving means which operates at least said intermittent film feeding means and said rotary shutter means;
5. shutter opening angle adjusting means which permits adjustment of the relative positions of said first and second shutter members for adjustment of the shutter opening angle;
6. photometric means which receives light corresponding to the quantity of light of the photographing object incident upon the surface of the film coming through said photographic optical means and which is provided with photo-electric converting means for producing an electric output signal corresponding to the quantity of the light received; and
7. exposure controlling means which controls the quantity of light to which the film is to be exposed to adjust the light quantity to a preset value, the exposure controlling means including the following:
    a. first light amount regulating means which effectively operates when the output of said photometric means is within a preset range of levels, the first light amount regulating means comprising:
    b. second light amount regulating means which is activated when the output of said photometric means is not within the preset range of levels, the second light amount regulating means including second control means which controls said shutter opening angle adjusting means according to the output of said photometric means.

26. In a motion picture camera, an improvement comprising:
1. photographic optical means for recording the image information on a film;
2. photometric means which includes:
    a. photo-electric converting means for producing an electric output signal corresponding to the quantity of light received;
    b. reference signal generating means which produces a reference signal to be used for comparison with the output of said photo-electric converting means; and
    c. comparing means which compares the output of said photo-electric converting means with the output of said reference signal generating means to produce an electric output signal corresponding to the difference between the two output signals compared;
3. light dividing means which divides the light of a photographing object passed through said photographic optical means into two light paths, the first path of light leading to the film and the second one leading to said photo-electric converting means;
4. exposure controlling means which controls the quantity of light to which the film is to be exposed to adjust the light quantity to a preset value, the exposure controlling means including the following:
    a. first light amount regulating means which effectively operates when the output of said comparing means is within a preset range of levels, the first light amount regulating means comprising:
        i. a diaphragm which is disposed in a path of light of said photographic optical means for the purpose of controlling the quantity of the light of the photographing object passing through the optical means; and
        ii. diaphragm controlling means which controls said diaphragm according to the output of said photometric means; and
    b. second light amount regulating means which is activated when the output of said comparing means is not within the preset range of levels, the second light amount regulating means comprising:
        i. filtering means which permits adjustment of light transmittance thereof with voltage impressed, the filtering means being disposed in the path of light of said photographic optical means; and
        ii. voltage impressing means which impresses voltage on said filtering means according to the level of the output of said comparing means when the output level exceeds said preset range of levels.

27. A camera as defined in claim 26, said reference signal generating means being provided with a reference signal level selecting means which permits shifting the reference signal level to a desired level.

28. A camera as defined in claim 26, said filtering means including a liquid crystal.

* * * * *